United States Patent Office 3,586,679
Patented June 22, 1971

3,586,679
PROCESS FOR THE PRODUCTION OF 2,4-DICHLORO-6-AMINO-s-TRIAZINES
Jai P. Tandon and William S. Durrell, Mobile, Ala., assignors to Ciba-Geigy Corporation, Greenburgh, N.Y.
No Drawing. Filed Nov. 21, 1968, Ser. No. 777,871
Int. Cl. C07d 55/18
U.S. Cl. 260—249.5                                    9 Claims

ABSTRACT OF THE DISCLOSURE

Method for the production of 2,4-dichloro-6-mono-substituted amino-s-triazines by reacting, in an anhydrous system, cyanuric chloride with a mono-substituted amine or a mono-substituted amine hydrohalide. The products obtained by the present invention are intermediates useful in the preparation of diamino-chloro-s-triazine products which are employed in inhibiting the growth of plants and are therefore widely employed as herbicides.

FIELD OF THE INVENTION

The present invention relates to a method for the production, in extremely high purity and in high yield, of 2,4-dichloro-6-mono-substituted amino - s - triazines by a process involving reacting, at an elevated temperature, and in an anhydrous reaction system, cyanuric chloride with a mono-substituted amine or a mono-substituted amine hydrohalide.

The products of the present process that is, the 2,4-dichloro-6-mono-substituted amino-s-triazines are intermediates useful in the preparation of diamino compounds which are valuable as agents in inhibiting the growth of plants and said diamino compounds are therefore widely employed as herbicides. Especially valuable commercial diamino compounds which are used as herbicides include commercial diamino compounds which are used as herbicides include compounds such as Atrazine (2-chloro-4-ethylamino-6-isopropylamino - s - triazine), Propazine (2-chloro-4,6-bis-isopropylamino - s - triazine), and the like. These compounds are employed both as selective herbicides for weed control among cultivated plants and as soil sterilants for the total elimination of undesired plants.

The 2,4-dichloro-6-mono-substituted amino-s-triazines obtained by the present invention are converted to the aforementioned diamino compounds by reaction with an equivalent amount of the same or a different primary or secondary amine.

A typical embodiment of the present invention involves reacting cyanuric chloride, at an elevated temperature that is, at a temperature between about 115° and 175° C. and in an anhydrous system, with a mono-substituted amine such as isopropylamine or a mono-substituted amine hydrohalide such as isopropylamine hydrochloride to obtain, for example, 2,4-dichloro-6-isopropylamino-s-triazine.

DESCRIPTION OF THE PRIOR ART

Dialkylamino - s - triazines are known compounds referred to as chlorotriazine herbicides which are generally prepared by reacting cyanuric chloride with alkylamines in step-wise fashion in the presence of a solvent. When using such a procedure, it was necessary to neutralize the HCl formed in the reaction with either (1) an excess of amine reactants or (2) an acid acceptor such as sodium hydroxide or sodium bicarbonate. Neutralization of the HCl by the use of an excess amine reactant or an acid acceptor obviously complicated the recovery of the desired amino-s-triazine and was also undesirable from an economic point of view. In addition, the failure to neutralize the HCl resulted in low yield of the desired amino-s-triazines.

U.S. Pat. 3,328,399 discloses a process for preparing amino-s-triazines without neutralizing the HCl formed in the reaction. However, this patent discloses only a procedure involving reacting cyanuric chloride with secondary amines in an anhydrous system and the HCl formed is distilled off from the reaction mixture.

Early experimental work involving the reaction of methyl- and ethylamine hydrochlorides with cyanuric chloride in an anhydrous system indicated that reaction occurred only at extremely high temperatures that is, at temperatures of 200° C. and higher. However, it was found that in addition to the desired 2,4-dichloro-6-mono-substituted amino-s-triazines, there was obtained large amounts of unknown and undesirable by-products.

SUMMARY OF THE INVENTION

In accordance with the present invention, 2,4-dichloro-6-mono-substituted amino-s-triazines are obtained in extremely high purity and in high yield by a fairly simple and practical procedure involving the reaction, in an anhydrous system, of cyanuric chloride with a mono-substituted amine or a mono-substituted amine hydrohalide, said mono-substituted amine reactant having at least 3 carbon atoms. By this procedure the concomitant formation of undesirable by-products is minimized and the mono-substituted amino product thus obtained can be reacted further to produce the ultimate commercially valuable diamino-chloro-s-triazine products which are characterized by herbicidal activity.

The reaction between cynauric chloride and the aforementioned mono-substituted amine or mono-substituted amine hydrohalide is carried out in a non-aqueous solvent system, at a temperatre ranging between about 115° and about 175° C.

The present procedure provides some important advantages over procedures hitherto used in the preparation of 2,4-dichloro-6-mono-substituted amino-s-triazines. First the use of an acid acceptor is unnecessary thereby providing a more simplified and practical procedure, as compared with prior art procedures. Then the desired products are obtained in high purity and yield. Further, when cyanuric chloride is reacted with a mono-substituted amine hydrochloride such as, for example, isopropylamine hydrochloride, the commercially valuable anhydrous hydrogen chloride is obtained as a by-product.

PREFERRED EMBODIMENTS OF THE INVENTION

In accordance with a preferred embodiment of the present invention, cyanuric chloride is reacted with a mono-substituted amine or a mono-substituted amine hydrohalide, in an anhydrous system, to obtain a 2,4-dichloro-6-amino-s-triazine, in extremely high purity and in high yield. The reaction is conducted in the absence of an acid acceptor. Products characterized by a purity as high as about 98% are obtained by the present procedure.

The basic reaction in the production of a 2,4-dichloro-6-amino-s-triazine by reacting, in an anhydrous system, cyanuric chloride with a mono-substituted amine such as isopropylamine or a mono-substituted amine hydrohalide such as isopropylamine hydrochloride can be set out as follows:

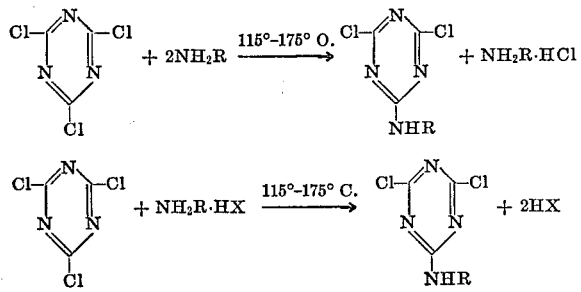

wherein R is a lower alkyl, lower alkenyl, or cycloalkyl group, the aforesaid alkyl or alkenyl groups containing from 3 to 6 carbon atoms. Typical examples of an alkyl group includes propyl, iso-propyl, butyl, iso-butyl, amyl, hexyl, and the like; the alkenyl group includes propenyl, butenyl, and the like. Cycloalkyl is intended to cover groups containing from 3 to 6 carbon atoms such as, for example, cyclopropyl, cyclobutyl, cyclohexyl, and the like and X is a halogen atom such as chlorine or bromine.

In a preferred embodiment of the invention, cyanuric chloride is reacted with a mono-substituted amine or a mono-substituted amine hydrohalide in an anhydrous solvent medium.

An illustrative 2,4-dichloro-6-mono-substituted amino-s-triazine that is, 2,4-dichloro-6-isopropylamine-s-triazine, is obtained by reacting cyanuric chloride with isopropylamine or isopropylamine hydrochloride at an elevated temperature and in the presence of a suitable non-aqueous solvent. The selected solvent should not only be non-reactive but in addition, should not hinder or adversely affect the course of the reaction. Operative solvents include xylene and high boiling solvents such as mesitylene, and the like, with xylene being generally preferred.

The reactions can be conducted at a temperature varying between about 115° C. and about 175° C. and preferably at a temperature of about 140–160° C. The reaction time is not critical but may vary widely depending of course upon the temperature at which the reaction is conducted.

The following non-limitative examples serve to illustrate the process of the invention. Unless otherwise indicated, parts are given by weight and the temperatures are in degrees centigrade.

EXAMPLE I

Cyanuric chloride (36.8 g., 0.200 mole) and 50 ml. of diphenyl ether were charged into a three neck round bottom flask fitted with stirrer, dropping funnel and a thermometer. To this mixture was added 6.2 g. methylamine (0.200 mole) in 150 ml. of diphenyl ether in 10 minutes. At the end of the addition, the temperature of the reaction mixture reached 100° C. The dropping funnel was replaced by a condenser and the reaction mixture was heated to distill off the HCl (200°–250° C.). The evolution of HCl started at 200° C.; it was distilled and absorbed in a 300 ml. sodium hydroxide solution (0.200 mole), 0.22 mole of HCl being trapped. The reaction mixture was cooled to room temperature and analyzed by gas chromatography. The product, 2,4-dichloro-6-methylamino-s-triazine did not resolve from diphenyl ether. The reaction mixture was further reacted with an aqueous solution (200 ml.) of 0.200 mole methylamine and 0.200 mole of sodium hydroxide. The reaction mixture was cooled, filtered and the product was washed and dried. The 31 g. of dry product which was obtained showed, on analysis, 9.1% salt, 1.5% water and 67.7% assay (morpholine condensation). The product did not melt up to 325° C. while the reported melting point is 241° C. Further, the product was characterized by very low solubility in acetone. While on the basis of the above analysis an apparent yield of 61% was obtained, this material contained very little, if any, 2,4-bis-(methylamino)-6-chloro-s-triazine.

EXAMPLE II

A similar procedure as described above was followed except for the replacement of methylamine by ethylamine hydrochloride and the product 2,4-dicholro-6-ethylamino-s-triazine was further reacted with isopropylamine in the presence of sodium hydroxide. The evolution of HCl started at 200° C.; it was distilled between 200°–256° C. and absorbed in a sodium hydroxide solution. 0.24 mole of HCl was recovered. 30 g. of dry product with an analysis of 3.4% salt, 1.2% water, 59.4 assay (morpholine condensation) was obtained.

Thin layer chromotography of this product indicated the presence of several unknown impurities. An apparent yield of 48% was isolated (based on the morpholine condensation analysis). This product contained about 40% 2,4-bis-(alkylamino)-6-chloro-s-triazine while the remainder was mainly an unknown product.

EXAMPLE III

A similar procedure as described above was followed except xylene was used as a solvent in place of diphenyl-ether and n-propylamine hydrochloride was used instead of the ethylamine reactant. The product, 2,4-dichloro-6-n-propylamino-s-triazine, was reacted further with n-propylamine in the presence of sodium hydroxide. The evolution of HCl started at 130° C.; it was distilled between 130°–150° C. and absorbed in a sodium hydroxide solution. 0.186 mole of HCl was recovered. Gas chromatography analysis showed a product distribution of 2% cyanuric chloride, 96% 2,4 - dichloro-6-n-propylamino-s-triazine and 2% 2,4-bis(n-propylamino)-6-chloro-s-triazine. The 2,4-dichloro-6-n-propylamino-s-triazine was further reacted with 0.2 mole of n-propylamine and 0.2 mole of sodium hydroxide. On work up, 45.3 g. of dry product with an analysis of 0.1% salt, 0.1% water and 95.3% assay (morpholine condensation) was obtained. The resulting product melted at 200°–212° C. indicating high purity (the reported M.P. is 210.5–212° C.). A yield of 94% was obtained (based on the analytical data).

Following the procedure described in this example except for the replacement of n-propylamine hydrochloride by allylamine hydrochloride there was obtained the corresponding 2,4-dichloro-6-allylamino-s-triazine.

EXAMPLE IV

A similar procedure as described in Example III above was followed except for the use of n-butylamine hydrochloride instead of n-propylamine hydrochloride. The product 2,4-dichloro-6-n-butylamino-s-triazine was reacted further with n-butylamine in the presence of sodium hydroxide. The evolution of HCl started at 125° C. and it was distilled and absorbed in a sodium hydroxide solution. 0.196 mole of HCl was recovered. Gas chromatography analysis showed a product distribution of 0.7% cyanuric chloride, 98.4% 2,4-dichloro-6-n-butylamino-s-triazine and 0.7% 2,4 - bis(n-butylamino)-6-chloro-s-triazine. The 2,4-dichloro-6-n-butylamino-s-triazine was further reacted with 0.2 mole of sodium hydroxide. On work up, 49.5 g. of the dry product with an analysis of 0.5% salt, 0.2% water and 99.9% assay (morpholine condensation) was obtained. This product melted at 205–209° C. while the reported M.P. is 207.5–209° C. A yield of 93.4% was obtained (based on the analytical data).

Similar yields of the desired product were obtained by use of n-butylamine instead of n-butylamine hydrochloride.

EXAMPLE V

Cyanuric chloride (184.4 g., 1.00 mole) and 500 ml. xylene were taken in a three neck round bottom flask fitted with stirrer, dropping funnel and a thermometer. To this mixture was added (1.00 mole) of isobutylamine in 10 minutes. At the end of the addition the temperature of the reaction mixture reached 100° C. The dropping funnel was replaced by a condenser and the reaction mixture was heated to distill off the HCl (125°–145° C.). The evolution of HCl started at 125° C.; it was distilled and absorbed in a sodium hydroxide solution. 0.93 mole of HCl was obtained. The reaction mixture was cooled and analyzed. The gas chromatography analysis showed a distribution of 5.1% cyanuric chloride, 89.8% 2,4-di-amino) - 6 - chloro-s-triazine and 0.4% 2,4,6-tris(isobutylamino)-s-triazine.

Similar yields of the desired product were obtained when isobutylamine hydrochloride was used instead of isobutylamine.

EXAMPLE VI

A similar procedure as described in Example V above for the reaction of isobutylamine and its hydrochloride with cyanuric chloride was followed except for the use of t-butylamine hydrochloride. The evolution of HCl started at 145° C., and it was distilled and absorbed in a sodium hydroxide solution. 0.90 mole of HCl was obtained. The gas chromatography analysis showed a distribution of 4% cyanuric chloride, 96% 2,4-dichloro-6-t-butylamino-s-triazine and a trace of 2,4-bis-(t-butylamino)-6-chloro-s-triazine.

Similar results were obtained when t-butylamine was used instead of t-butylamine hydrochloride.

EXAMPLE VII

A similar procedure as described in Example V was followed except that cyclohexylamine was used. The evolution of HCl started at 130° C.; it was distilled and absorbed in a sodium hydroxide solution. 0.195 mole of HCl was obtained. The gas chromatography analysis of the reaction mixture showed a distribution of 0.25% cyanuric chloride, 99.5% 2,4-dichloro-6-cyclohexylamino-s-triazine and 0.25% 2,4-bis(cyclohexylamino)-6-chloro-s-triazine. The 2,4 - dichloro-6-cyclohexylamino-s-triazine was further reacted with 0.2 mole of cyclohexylamine and 0.2 mole of sodium hydroxide. On usual work up, 59.7 g. of dry product with an analysis of 0.1% water and 99.6% assay (morpholine condensation) was obtained. This product melted at 224–228° C. (while the reported M.P. is 228–229° C.). A yield of 95% was obtained.

Similar results were obtained when cyclohexylamine hydrochloride was used instead of cyclohexylamine.

Using the procedure described above except for the replacement of cyclohexylamine by cyclopropylamine or cyclopropylamine hydrochloride, the corresponding 2,4-dichloro-6-cyclopropylamino-s-triazine was obtained.

EXAMPLE VIII 92.2 g. of cyanuric chloride (0.5 mole) 103.0 g. 2,4-dichloro - 6 - isopropylamino-s-triazine, and 400 ml. of xylene were taken in a three neck round bottom flask fitted with stirrer, dropping funnel and a condenser. To this mixture was added 47.8 g. of isopropylamine hydrochloride (0.5 mole) over a period of ten minutes. The reaction mixture was heated at reflux temperature (142–150° C.) for thirty minutes and the hydrogen chloride evolved was then separated. Analysis of the reaction mixture showed the yield of 2,4-dichloro-6-isopropylamino-s-triazine was in excess of 96%.

It will be understood that various changes may be made in the preferred embodiments of the process described hereinabove. Accordingly, the preceding description is intended as illustrative only and should not be considered in a limitative sense.

We claim:
1. In a process for the preparation of 2,4-dichloro-6-alkylamino-s-triazines by a procedure involving reacting cyanuric chloride with an alkylamine or an alkylamine hydrohalide, the improvement comprising reacting said cyanuric chloride with a mono-alkylamine or a mono-alkylamine hydrohalide containing from 3 to 6 carbon atoms in an anhydrous medium at a temperature ranging between about 115° and 175° C.

2. A process according to claim 1, wherein the reaction is conducted in an inert anhydrous solvent medium.

3. A process according to claim 2, wherein the solvent is a high boiling aromatic solvent.

4. A process according to claim 3, wherein the solvent is a xylene or mesitylene.

5. A process according to claim 1, wherein the reactants are employed in equimolar amounts.

6. A process according to claim 1, wherein the alkylamine is isopropylamine.

7. A process according to claim 1, wherein the alkylamine hydrohalide is isopropylamine hydrochloride.

8. A process according to claim 7, wherein the reaction is conducted at a temperature of about 140° to 160° C.

9. A process according to claim 1, wherein 2,4-dichloro - 6-isopropylamino-s-triazine is obtained by reacting cyanuric chloride with isopropylamine or isopropylamine hydrochloride, the aforesaid reaction being conducted in xylene.

References Cited

UNITED STATES PATENTS

| | | | |
|---|---|---|---|
| 2,720,480 | 10/1955 | Wolf | 260—249.5X |
| 3,074,946 | 1/1963 | Rattenbury et al. | 260—249.5 |
| 3,198,797 | 8/1965 | Dexter et al. | 260—249.5 |
| 3,245,992 | 4/1966 | Dexter et al. | 260—249.5X |
| 3,328,399 | 6/1967 | Prill | 260—249.5 |
| 3,376,302 | 4/1968 | Grauer | 260—249.5 |

JOHN M. FORD, Primary Examiner

U.S. Cl. X.R.

71—93